A. HALL.
Churn.

No. 6,777. Patented Oct. 9, 1849.

UNITED STATES PATENT OFFICE.

ALEXANDER HALL, OF LOYDSVILLE, OHIO.

CHURN.

Specification of Letters Patent No. 6,777, dated October 9, 1849.

*To all whom it may concern:*

Be it known that I, ALEXANDER HALL, of Loydsville, in the county of Belmont and State of Ohio, have invented a new and useful Improvement in Churns, of which the following is a full, clear, and exact description, reference being had to the accompanying drawing, forming part of this specification, in which—

Figure 1:
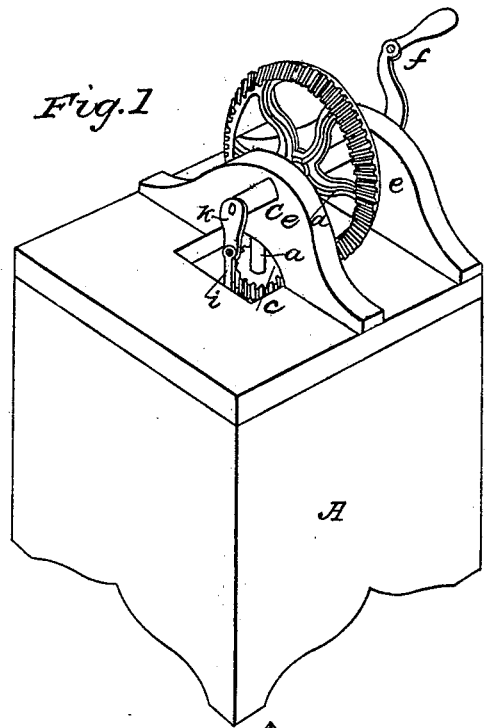
Figure 2:
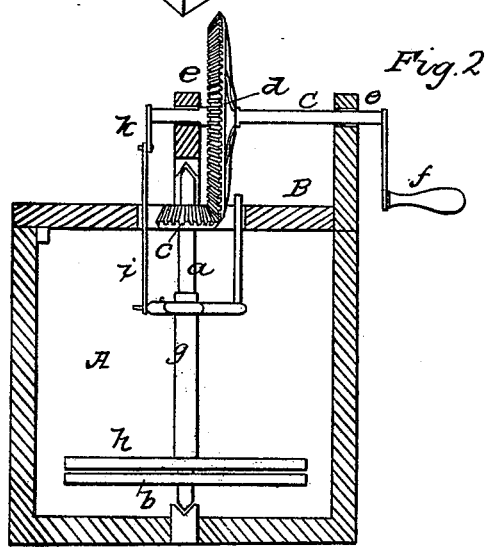

Figure 1 represents a perspective view of my improved churn, and Fig. 2 an elevation of the same with one of the sides of the churn tub removed.

The nature of my improvement consists in combining a vertical reciprocating-dasher with a horizontal rotary-dasher so as to break and agitate the cream in two directions at once.

In the accompanying drawings A is the churn tub constructed of suitable materials, and of any convenient size and form. Within this churn tub a spindle $a$ is supported in a vertical position by a step in the bottom of the tub and a bearing in its top (B), or is suspended in a vertical position from the top alone; to the lower extremity of this spindle is secured the dasher $b$; the vertical spindle has a beveled pinion $c$ attached to its upper extremity which gears into a corresponding beveled wheel $d$ mounted upon a horizontal driving shaft C, supported in bearings $e$ $e$ in standards on the lid of the churn, and put in motion by a crank $f$ or by any other suitable device. The vertical spindle serves as a guide on which slides the tubular stem $g$ of a reciprocating dasher $h$; the upper extremity of the stem is connected by a rod $i$ with the pin of a crank $k$ attached to the inner extremity of the driving shaft.

The cream or milk is placed in the tub and power being applied to the driving shaft ($c$) a rapid rotary motion is communicated through the wheels $c$ $d$ to the dasher $b$ while at the same time the upper dasher $h$ receives a vertical reciprocating motion through the crank $k$ and rod $i$. The double motion thus produced agitates the cream in the most effectual manner, as the currents produced by either dasher are broken and distorted by the other.

I have described the lower dasher as revolving and the upper as reciprocating, but it is obvious that by attaching the beveled pinion to the tubular stem the upper dasher would be made to revolve, while the inner spindle could be connected with the crank and thus receive a reciprocating motion.

What I claim as my invention and desire to secure by Letters Patent is—

The combination of a reciprocating dasher ($h$) with a revolving dasher ($b$) the two being arranged and operated substantially as herein set forth.

In testimony whereof I have hereunto set my hand this seventh day of August A. D. 1849.

ALEX. HALL.

Witnesses:
STEPHEN K. REYNOLDS,
DANIEL MERCER.